US012750742B2

(12) United States Patent
Tenny et al.

(10) Patent No.: US 12,750,742 B2
(45) Date of Patent: Sep. 29, 2026

(54) GROUP HANDOVER WITH DELAYED OR OMITTED SIGNALING FOR LAYER 2 SIDELINK RELAYING

(71) Applicant: MediaTek Singapore Pte. Ltd., Singapore (SG)

(72) Inventors: Nathan Edward Tenny, San Jose, CA (US); Xuelong Wang, Beijing (CN); Chun-Fan Tsai, Hsinchu (TW)

(73) Assignee: MEDIATEK Singapore Pte. Ltd, Singapore (SG)

( * ) Notice: Subject to any disclaimer, the term of this patent is extended or adjusted under 35 U.S.C. 154(b) by 531 days.

(21) Appl. No.: 17/681,696

(22) Filed: Feb. 25, 2022

(65) Prior Publication Data

US 2022/0191745 A1 Jun. 16, 2022

Related U.S. Application Data

(63) Continuation of application No. PCT/CN2020/137893, filed on Dec. 21, 2020.

(51) Int. Cl.

*H04W 36/00* (2009.01)
*H04W 36/38* (2009.01)
*H04W 88/04* (2009.01)

(52) U.S. Cl.

CPC ........ *H04W 36/0009* (2018.08); *H04W 36/38* (2013.01); *H04W 88/04* (2013.01)

(58) Field of Classification Search

CPC .. H04W 36/0009; H04W 36/38; H04W 88/04
USPC ........................................................ 370/331
See application file for complete search history.

(56) References Cited

U.S. PATENT DOCUMENTS

2014/0169265 A1* 6/2014 Park ...................... H04W 40/36 370/315
2018/0279188 A1* 9/2018 Tenny ............... H04W 36/0016
2019/0239132 A1* 8/2019 Wallentin .............. H04W 88/04
2020/0015192 A1* 1/2020 Chun .................... H04W 76/27
2020/0037218 A1* 1/2020 Karampatsis ..... H04W 36/0085
2020/0128447 A1* 4/2020 Ying ............. H04W 36/008355

FOREIGN PATENT DOCUMENTS

WO WO 2018201487 A1 8/2018

OTHER PUBLICATIONS

PCT Written Opinion and search report for application PCT/CN2020/137893, mailed on Mar. 29, 2021, 9 pages.
China patent office Written Opinion and search report for application 202080063119.7, mailed on Apr. 28, 2023, 9 pages.

* cited by examiner

*Primary Examiner* — Faisal Choudhury
(74) *Attorney, Agent, or Firm* — Helen Mao; Zheng Jin; Imperium Patent Works

(57) ABSTRACT

A method of performing a group handover procedure in a layer 2 relaying architecture is proposed to meet the group handover timing constraints. A relay device and one or more remote devices are collectively relocated from a source network node to a target network node, where messages of the group handover procedure are selectively delayed or omitted to ensure synchronisation of the handover operations at the various devices.

6 Claims, 5 Drawing Sheets

GROUP HANDOVER WITH DELAYED OR OMITTED SIGNALING FOR LAYER 2 SIDELINK RELAYING

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2020/137893, with an international filing date of Dec. 21, 2020, which in turn claims priority from International Application No. PCT/CN2019/127835, entitled "Group Handover with Delayed or Omitted Signaling for Layer 2 Sidelink Relaying," filed on Dec. 24, 2019. This application is a continuation of International Application No. PCT/CN2020/137893, which claims priority from International Application No. PCT/CN2019/127835. International Application No. PCT/CN2020/137893 is pending as of the filing date of this application, and the United States is a designated state in International Application No. PCT/CN2020/137893. The disclosure of each of the foregoing documents is incorporated herein by reference.

TECHNICAL FIELD

The disclosed embodiments relate generally to wireless network communications, and, more particularly, to group handover procedure for layer 2 sidelink relaying in 5G new radio (NR) wireless communications systems.

BACKGROUND

In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). New technologies in 5G new radio (NR) allow cellular devices to connect directly to one another using a technique called sidelink communications. Sidelink is the new communication paradigm in which cellular devices are able to communicate without relaying their data via the network. As compared to WiFi and NR unlicensed spectrum operation, a PC5 link (or sidelink) based mobile device potentially possesses the following features: 1) deployment by both operator and user; 2) operation in both unlicensed spectrum and licensed spectrum; 3) similar protocol stacks complexity to WiFi; 4) better multiplexing efficiency than WiFi; 5) better mobility support than WiFi, e.g., service continuity; 6) larger maximal TX power than WiFi for larger coverage: 7) support single-hop and/or multi-hop relay.

In a sidelink relaying architecture, a relay UE is served directly by a network node such as an eNB (LTE) or a gNB (NR), and the relay UE offers service over a sidelink interface to one or more remote UEs. The remote UEs may be in or out of coverage of a network node; one possible application of a relaying design is to extend coverage to remote UEs that are not visible to the base station (for example, indoor UEs in a deployment where the network's operating frequency has poor indoor penetration). Group handover operation in a layer 2 relaying architecture allows synchronised handover of a relay UE along with one or more remote UEs served by the relay UE. However, there are constraints on the timing and order of the messages exchanged between the serving gNB and the relay and remote UEs, which may impose a requirement on the relay UE to forward messages at a specific stage of the handover operation, or risk having messages delivered to or from the wrong network node, or in the worst case lost entirely. A solution is sought to enable a relay UE to meet these constraints so that the handover can complete properly for all involved UEs.

SUMMARY

A method of performing a group handover procedure in a layer 2 relaying architecture is proposed to meet the group handover timing constraints. A relay device and one or more remote devices are collectively relocated from a source network node to a target network node, where messages of the group handover procedure are selectively delayed or omitted to ensure synchronisation of the handover operations at the various devices.

In one embodiment, a relay UE receives a first handover command from a source base station. The relay UE offers relaying service to a remote UE and selectively stops the relaying service upon receiving the first handover command. The relay UE receives a second handover command from the source base station for forwarding to the remote UE. The relay UE performs a handover to a target base station and sends a first handover complete message of the relay UE to the target base station. The relay UE resumes the relaying service after completion of the handover. The relay UE forwards a second handover complete message sent from the remote UE to the target base station.

In another embodiment, a relay UE receives a first handover command from a serving base station. The relay UE offers relaying service to a remote UE. The relay UE receives a second handover command from the serving base station, and in response forwards the second handover command to the remote UE. The relay UE performs a handover to a target base station and sends a first handover complete message of the relay UE to the target base station upon completing the handover. The relay UE receives a second handover complete message sent from the remote UE without forwarding the second handover complete message to the target base station.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
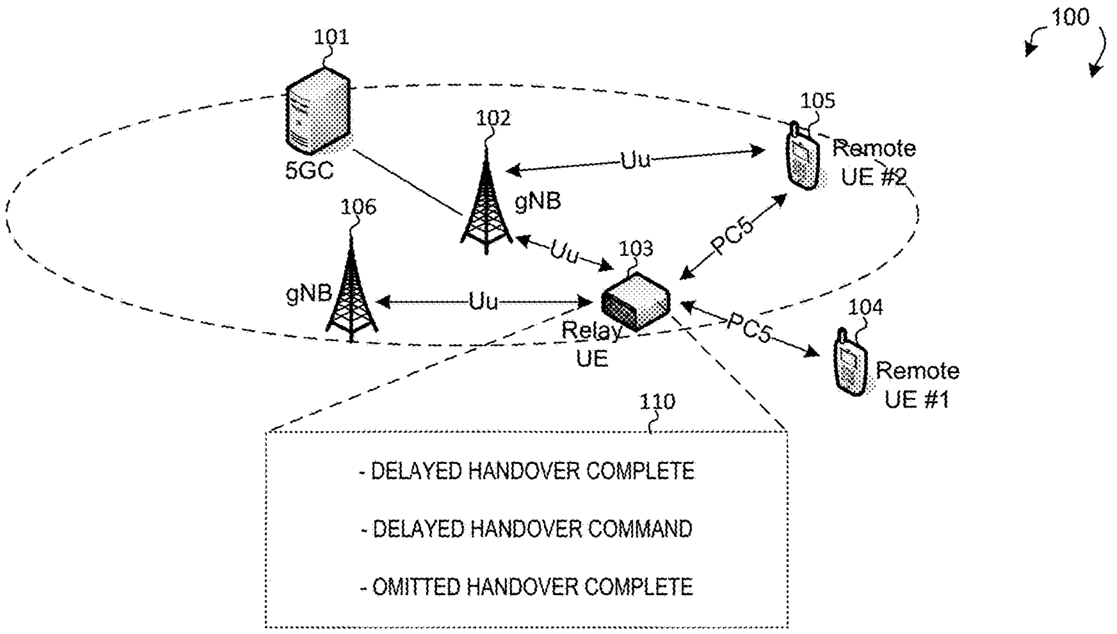
FIG. 1 illustrates a wireless communications system supporting group handover for layer 2 sidelink relay in accordance with a novel aspect.

FIG. 1 illustrates a wireless communications system 100 supporting PC5-based mobile device relay in accordance with a novel aspect. 5G new radio (NR) mobile communication network 100 comprises a 5G core (5GC) 101, a first base station gNodeB 102, a second base station gNodeB 106, and a plurality of user equipments UE 103, UE 104, and UE 105. For in-coverage UEs, a base station can schedule the data traffic over Uu link. For in-coverage or out-of-coverage UEs, another UE (for instance, relay UE 103) can communicate the data traffic over PC5 (or sidelink). In FIG. 1, UE 103 is a UE in a connected state of a radio resource control (RRC) protocol that acts as a mobile device relay using PC5 (or sidelink) to relay data traffic to/from end remote UEs for coverage extension. Remote UE 104 is not directly connected to the network. Relay UE 103 helps to relay all control signaling and data traffic for remote UE 104. Remote UE 105 is connected to the network via Uu link but the link quality may be poor. Relay UE 103 helps to relay part or all of the control signaling and/or data traffic for remote UE 105.

In the existing art on the Uu interface between a UE and a network node (e.g. a gNB), the handover (HO) procedure from a source node to a target node comprises a "handover command" message (a reconfiguration message which is generated at the target node, sent to the source node, and delivered over the air to the UE by the source node) and a "handover complete" message (a reconfiguration complete message which is generated by the UE upon completion of the handover and sent over the air to the target node). In NR, these messages are an RRCReconfiguration message and an RRCReconfigurationComplete message of the RRC protocol, respectively. The handover complete message notifies the target node that the UE has successfully performed handover, meaning, for example, that data transfer between the UE and the target node over the air can begin. In some instances of handover, the source node and target node may be the same node, e.g., the UE may hand over between two cells operated by the same network node. In such instances, the network and UE may nevertheless perform the same handover steps as for a handover between different network nodes. This practice may have the effect of concealing the network topology from the UE, in the sense that the UE does not know when it is handing over between cells within a single network node and when it is handing over between cells of different network nodes.

In a sidelink relaying architecture, a relay UE is served directly by a network node such as an eNB (LTE) or a gNB (NR), and the relay UE offers service over a sidelink interface to one or more remote UEs. The remote UEs may be in or out of coverage of a network node; one possible application of a relaying design is to extend coverage to remote UEs that are not visible to the base station (for example, indoor UEs in a deployment where the network's operating frequency has poor indoor penetration). When a relay node hands over from a source network node to a target network node, its RRC context is relocated from the source node to the target node. Accordingly, it is expected that the RRC context(s) of any remote UE(s) served by the relay UE would be relocated in the same way. This allows the relaying service to continue under the control of the target node after the handover. Because of the need to carry handover signaling to and from all the remote UEs substantially simultaneously, an approach called "group handover" has previously been considered for use with layer 2 relaying architectures in 3GPP, consisting of collecting the handover signaling for multiple UEs in a single message.

However, certain problems relating to the delivery of the handover signaling persist. For example, all the handover command messages for the relay and remote UEs must be sent from the source network node to the corresponding UEs, meaning that the relay UE needs to remain in the source cell until all the handover command messages have been delivered; and all the handover complete messages need to be sent from the involved UEs to the target network node, meaning that the relay UE needs to move to the target cell before any of the handover complete messages can be delivered. However, the relay UE cannot easily determine which messages are the handover command and handover complete messages, making it difficult to meet these timing constraints.

In accordance with one novel aspect, a method of performing a group handover procedure in a layer 2 relaying architecture is proposed to meet the group handover timing constraints. A relay device and one or more remote devices are collectively relocated from a source network node to a target network node, where messages of the group handover procedure are selectively delayed or omitted to ensure synchronisation of the handover operations at the various devices. In the example of FIG. 1, relay UE 103 is first located in a source cell served by source node gNB 102, and then hands over to a target cell served by target node gNB 106. In a first embodiment, upon relay UE 103 receives its own handover command from source gNB 102, relay UE 103 delays the forwarding of handover complete messages from remote UEs 104 and 105 to the target gNB 106, until relay UE 103 itself has completed handover to the target gNB 106. In a second embodiment, relay UE 103 receives a group handover command from gNB 102, including handover commands for itself and for one or more remote UEs (for example, remote UEs 104 and 105). After receiving its own handover command, relay UE 103 stops forwarding. Relay UE 103 resumes forwarding after it hands over to target gNB 106. In a third embodiment, when the target gNB 106 receives the relay UE 103's handover complete message, it assumes that all remote UEs have also handed over successfully, thereby allowing relay UE 103 to omit forwarding the handover complete messages from the remote UEs 104 and 105 entirely.

Figure 2:
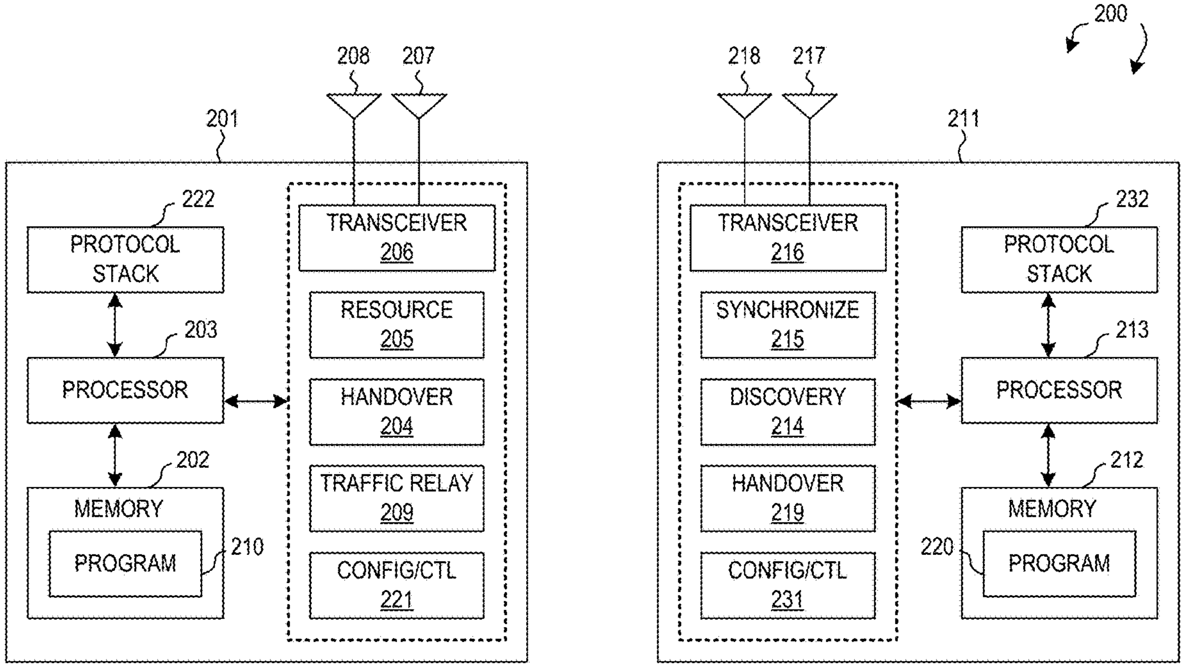
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station or a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a resource management circuit 205 for allocating and scheduling sidelink resources, a handover handling circuit 204 for performing a handover procedure, a traffic relay handling controller 209 for relaying all or part of control signaling and/or data traffic for remote UEs, and a control and configuration circuit 221 for providing control and configuration information. Wireless device 211 is a remote UE that includes a protocol stack 232, a synchronization handling circuit 215, a relay discovery circuit 214 for discovering relay UEs, a handover handling circuit 219 for performing handover, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly. In one example, a group handover in a layer 2 relaying architecture is performed, in which relay UE 201 and one or more remote UEs including remote UE 211 are collectively relocated from a source network node to a target network node, wherein messages of the group handover procedure are selectively delayed or omitted to ensure synchronisation of the handover operations at the various devices.

Figure 3:
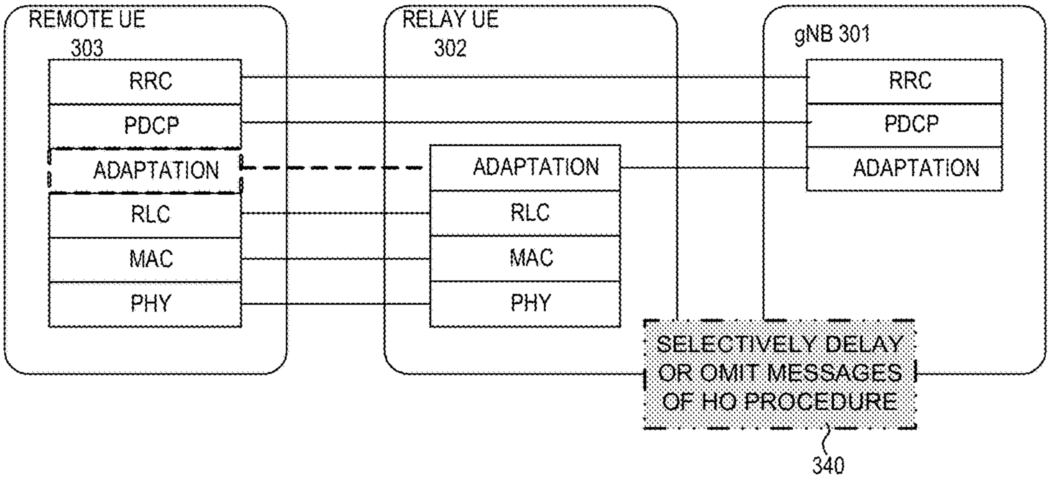
FIG. 3 illustrates a layer 2 relaying architecture for handover procedure with delayed or omitted signaling in accordance with one novel aspect.

FIG. 3 illustrates an exemplary control-plane protocol stack for a layer 2 relaying architecture for handover procedure with delayed or omitted signaling in accordance with one novel aspect. In a “layer 2” relaying architecture, the protocol stacks of the network node gNB 301, the relay UE 302, and the remote UE 303 are arranged such that relaying takes place in layer 2 of the protocol stack, or in a sublayer of layer 2. For example, relaying may take place between a packet data convergence protocol (PDCP) sublayer and a radio link control (RLC) sublayer. An adaptation layer may be introduced between the layer 2 sublayers of the protocol stack; the adaptation layer may, for example, be responsible for bearer mapping, packet or message routing, and/or similar functions related to directing relayed traffic between the network node and the remote UE. An exemplary control-plane protocol stack for a layer 2 relaying architecture is shown in FIG. 3. A user-plane protocol stack might be expected to resemble the control-plane stack, without the RRC protocol in the topmost layer, and potentially with one or more additional sublayers such as a service data adaptation protocol (SDAP) sublayer located above the PDCP sublayer. Note that in FIG. 3, the adaptation layer is shown as optional between the relay UE and the remote UE. In some embodiments the adaptation layer may extend to the remote UE, while in others it may terminate at the relay UE. It may be necessary to include the adaptation layer in the protocol stack of the remote UE if the adaptation layer’s functions include packet segmentation, since in such a case the remote UE would need to be able to reassemble the segments of a packet.

In a layer 2 relaying architecture, each remote UE has a radio resource control (RRC) context in the serving base station. From the base station’s perspective, each remote UE has its own RRC connection and its own protocol entities for the upper layers of the protocol stacks (for instance, RRC and PDCP entities), while the protocol entities for the lower layers of the protocol stacks (for instance, RLC, medium access control (MAC), and physical (PHY) entities) are associated with the relay UE’s RRC context instead of the remote UE’s RRC context. One consequence of this protocol architecture, which is relevant to the functionality of group handover, is that signaling messages and user data can be secured end-to-end between the network node and the remote UE, in the PDCP layer. For example, the PDCP layer may be responsible for ciphering and deciphering of signaling messages and/or user data, as well as for applying and checking integrity fields that may be used to cryptographically confirm the validity and source of a transmission.

If transmissions are ciphered end-to-end in this manner, the relay UE does not have the ability to read the contents of the transmissions, and in particular, the relay UE may forward signaling messages without knowing the type or contents of the messages. It is noted that the relay UE may be able to distinguish signaling messages from user data, for instance, using bearer mapping information in the adaptation layer. For example, the relay UE may be able to recognise that a particular transmission is mapped to a signaling radio bearer (SRB) and thus is a signaling message. However, since the relay UE cannot easily determine which messages are the handover command and handover complete messages, it is difficult to meet the timing constraints to ensure synchronization of handover operations involving sidelink relaying. Accordingly, messages of a handover procedure are selectively delayed or omitted by the relay UE 302 or the network node 301 to ensure synchronization of the handover operation at various devices (as depicted by 340).

Figure 4:
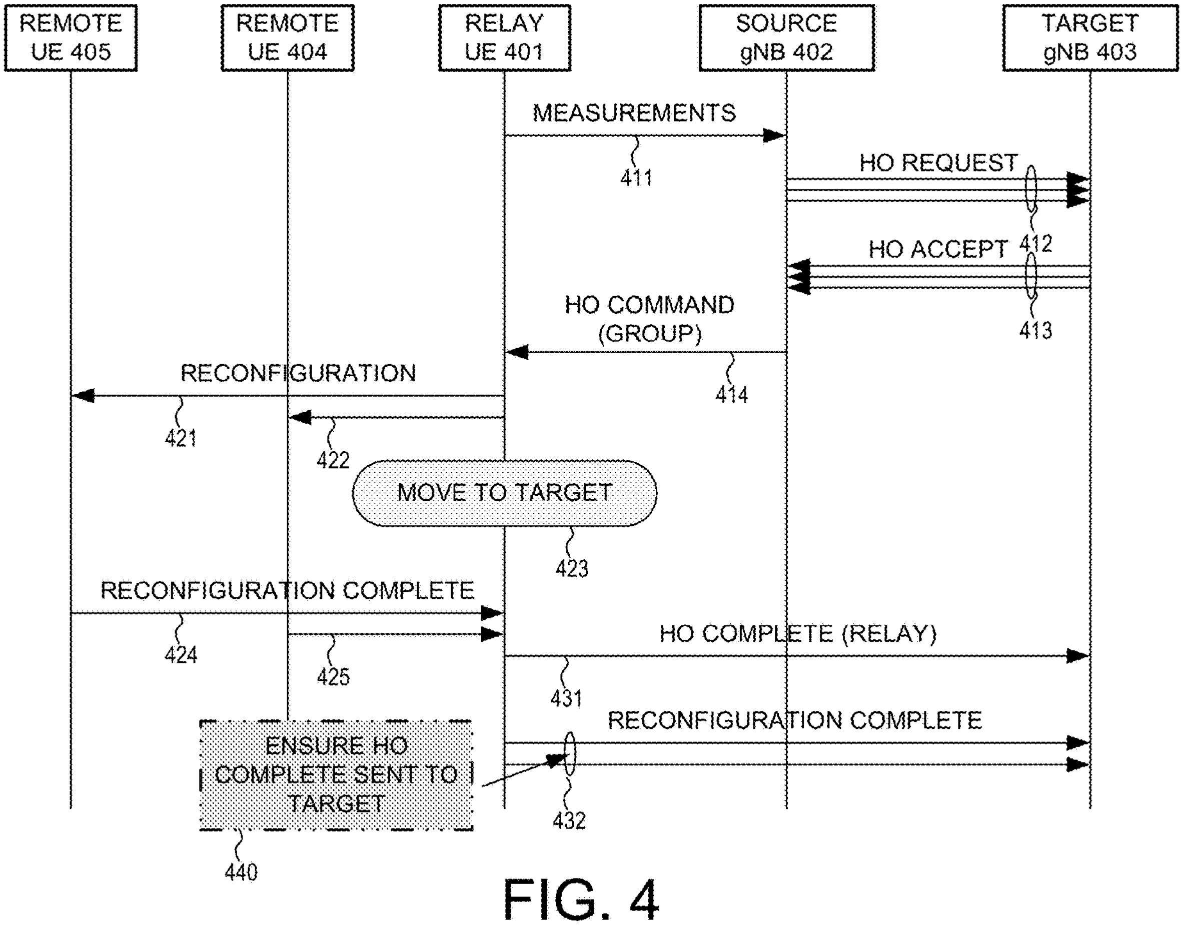
FIG. 4 illustrates a group handover procedure with sidelink relaying.

FIG. 4 illustrates a group handover procedure with sidelink relaying. In step 411, relay UE 401 sends one or more measurement reports to source gNB 402. Based on the measurement reports, in step 412, source gNB 402 sends multiple handover requests to target gNB 403 to handover relay UE 401, remote UE 404 and remote UE 405 from the source gNB to the target gNB. In step 413, target gNB 403 sends multiple handover accept messages back to source gNB 402 in response to the handover requests. A basic method of group handover, which may be referred to as a “group handover command” approach, entails grouping together the handover command messages for the relay UE and one or more remote UEs. In this approach, a single message from the network (referred to as a group handover message) carries multiple handover commands. These handover commands could be, for example, encapsulated as protocol data units (PDUs) of an RRC protocol. In step 414, the relay UE 401 receives the group handover message and forwards each of the handover commands to the corresponding remote UE 405 and remote UE 404 (steps 421 and 422). In step 423, relay UE 401 applies its own handover command and moves to the target cell. The relay UE 401 then receives handover complete messages from remote UE 405 and UE remote 404 (steps 424 and 425). In step 431, in the target cell, relay UE 401 sends its own handover complete message to target gNB 403, and also forwards the handover complete messages of the remote UEs according to the normal behaviour of the layer 2 relaying architecture (step 432).

A complementary approach to group handover, which may be referred to as a "group handover response" approach, comprises collecting the handover complete messages from multiple remote UEs at the relay UE, and forwarding them together to the target gNB after the handover, potentially along with the handover complete message of the relay UE itself. This approach has the effect of synchronising the handover completion for the relay and remote UEs in the target gNB.

In the example of FIG. 4, the following steps are needed for the group handover procedure involving relaying. 1) Admission of the relay and remote UEs to the target network node; 2) Delivery of handover command to the relay UE from the source network node; 3) Delivery of handover command(s) to the remote UE(s) from the source network node; 4) Relocation of UE contexts from the source network node to the target network node; 5) Completion of handover in the target cell by the relay UE; 6) Delivery of handover complete message from the relay UE to the target network node; 7) Delivery of handover complete message(s) from the remote UE(s) to the target network node.

The group handover command approach combines steps 2) and 3) into a single message. It is noted that there are constraints affecting these procedural steps. For steps 2) and 3), the relay UE needs to be in the source cell, so that it can receive the handover command messages over the air from the source network node, while for steps 5)-7), the relay UE needs to be in the target cell, so that it can complete its own handover and deliver the handover complete messages over the air to the target network node. This set of constraints suggests that the relay UE's handover should be delayed to allow delivery of the handover commands in step 3), or that steps 2) and 3) should be combined as in the group handover command scheme. The constraints also suggest that the handover complete messages of step 7) should be delayed until after the relay has moved; the group handover command approach does not address this aspect. In accordance with one novel aspect, when group handover is performed (with or without the group handover command approach), the relay UE can enforce the restriction that handover complete messages should not be sent to the source network node (440), by either delaying the HO command or the HO complete message, or by omitting the HO complete message.

Figure 5:
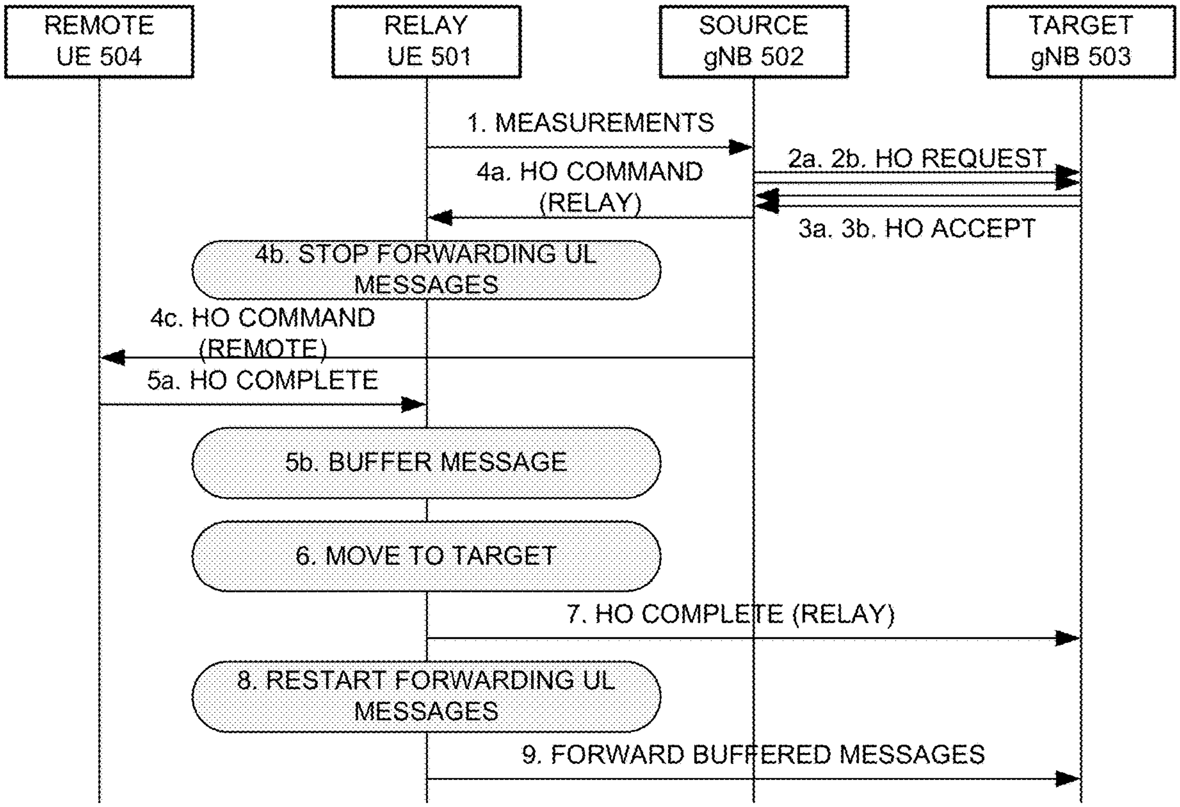
FIG. 5 illustrates a first embodiment of delayed handover complete message in a handover procedure with sidelink relaying in accordance with one novel aspect.

FIG. 5 illustrates a first embodiment of delayed handover complete message in a handover procedure with sidelink relaying in accordance with one novel aspect. In the embodiment of FIG. 5, the relay UE may selectively delay forwarding the handover complete messages from the remote UEs until the relay UE itself has completed handover. That is, after receiving its own handover command, the relay UE stops forwarding uplink signaling and traffic from the remote UE(s) to the source network node, and anything received is buffered at the relay UE for later transmission to the target network node. This means that the handover complete messages will be captured by the relay UE and held until after the relay UE's handover. However, since the relay UE cannot distinguish the handover complete messages from other signaling messages, this means that anything the remote UE attempts to send to the source network node will instead be sent to the target network node after the handover. This may result in unexpected signaling to the target network node. However, such cases should be infrequent, and may not cause a problem if the network node implementation can handle them intelligently. For example, the network node could simply discard any message received from a remote UE for which it has an RRC context but from which it has not yet received a handover complete message. This approach can be seen as a relative of the "group handover response" solution, in that it depends on special handling of the handover complete messages at the relay UE. It is in fact compatible with the "group handover response" operation; in the course of delaying the forwarding of handover complete messages, the relay UE may batch them together in a single message for the target network node.

A signaling flow for the "delayed handover complete message" solution, with a single remote UE, is shown in FIG. 5. In FIG. 5, relay UE 501 sends one or more measurement reports to source gNB 502 (step 1). Source gNB 502 and target gNB 503 exchange HO request and HO accept (steps 2*a*, 2*b*, 3*a*, 3*b*). Relay UE 501 stops forwarding messages in the uplink direction (step 4*b*) before sending the handover command to the remote UE 504 (step 4*c*), thus guaranteeing that the handover complete message from remote UE 504 (step 5*a*) will be buffered at relay UE 501 (step 5*b*). After moving to target gNB 503 (step 6), relay UE 501 may send its own handover complete message (step 7), and then resume forwarding of messages in the uplink direction (step 8), and specifically forward the buffered handover complete message from UE 504 to gNB 503 (step 9). Variations in the details of this message flow are possible. For instance, the handover commands (steps 4*a* and 4*c*) may be grouped into a single message on the Uu interface between source gNB 502 and relay UE 501, in accordance with the "group handover command" approach described earlier, with no effect on the rest of the flow. Similarly, the network traffic between source gNB 502 and target gNB 503 could be grouped together, e.g. by combining steps 2*a* and 2*b* and/or steps 3*a* and 3*b*.

The "delayed handover complete message" approach can guarantee that the handover complete message(s) from the remote UE(s) are always sent to the target network node. However, it cannot guarantee that only the handover complete message(s) will be sent to the target network node. As noted above, additional signaling messages may be delivered to the target network node, potentially before the arrival of the handover complete message. Such signaling messages may be handled by the network node, e.g., by being discarded.

Figure 6:
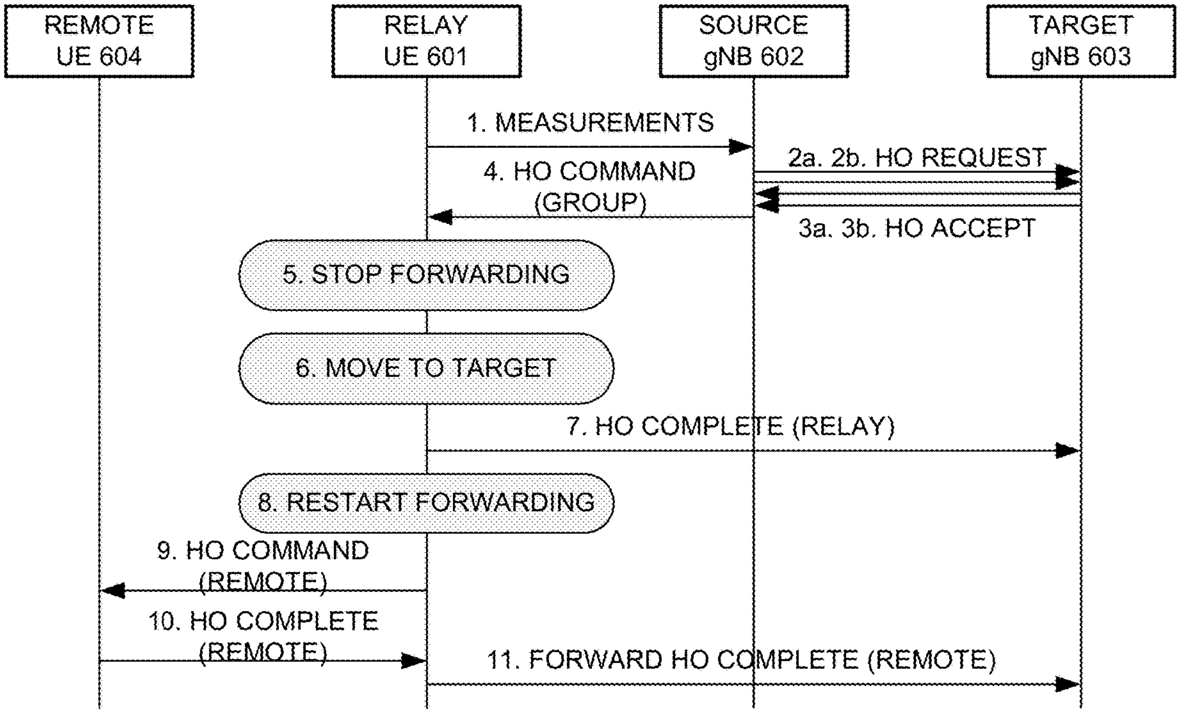
FIG. 6 illustrates a second embodiment of delayed handover command message in a handover procedure with sidelink relaying in accordance with one novel aspect.

FIG. 6 illustrates a second embodiment of delayed handover command message in a handover procedure with sidelink relaying in accordance with one novel aspect. A complementary approach is to hold the handover command message(s) (instead of the handover complete message(s)) at the relay UE. In this solution, the source network node (for instance, a gNB) sends the relay UE's handover command in a group with the remote UEs' handover commands; after receiving its handover command, the relay UE stops all forwarding. It then moves to the target network node immediately, sends its own handover complete message, and resumes forwarding. This means that the remote UEs receive handover commands only after the relay UE has performed handover, and so any response they send will be forwarded to the target network node. From the perspective of the remote UEs, the handover commands are still seen as coming from the source network node, because the remote UEs are unaware of the relay UE's handover.

A signaling flow for the "delayed group handover command" solution, with a single remote UE, is shown in FIG. 6. Relay UE 601 sends one or more measurement reports to source gNB 602 (step 1). Source gNB 602 and target gNB 603 exchange HO request and HO accept messages (steps 2*a*, 2*b*, 3*a*, 3*b*). The handover commands for relay UE 601 and remote UE 604 are delivered as a group handover command from source gNB 602 (step 4), after which the relay UE 601 immediately stops all forwarding (step 5) and moves to the target cell (step 6). The relay UE 601 delivers its own handover complete to the target gNB 603 (step 7), then resumes forwarding (step 8). The relay UE 601 delivers the handover command message to remote UE 604 (step 9) and receives the corresponding handover complete message from remote UE 604 (step 10). Relay UE then forwards the handover complete message to target gNB 603 in accordance with normal relaying operation (step 11).

Similar to the "delayed group handover complete" embodiment described in FIG. 5, the second embodiment in FIG. 6 cannot prohibit additional signaling in the uplink direction from reaching the target network node. In particular, any message sent by the remote UE 604 after step 5 will reach relay UE 601, which has a choice of discarding the message or buffering the message. If relay UE 601 discards messages received while forwarding is stopped, the message will never be received by any network node at all. If relay UE 601 buffers them for later forwarding, the message will be received when forwarding resumes at step 8, by the target network node, which may not result in the intended behaviour.

Figure 7:
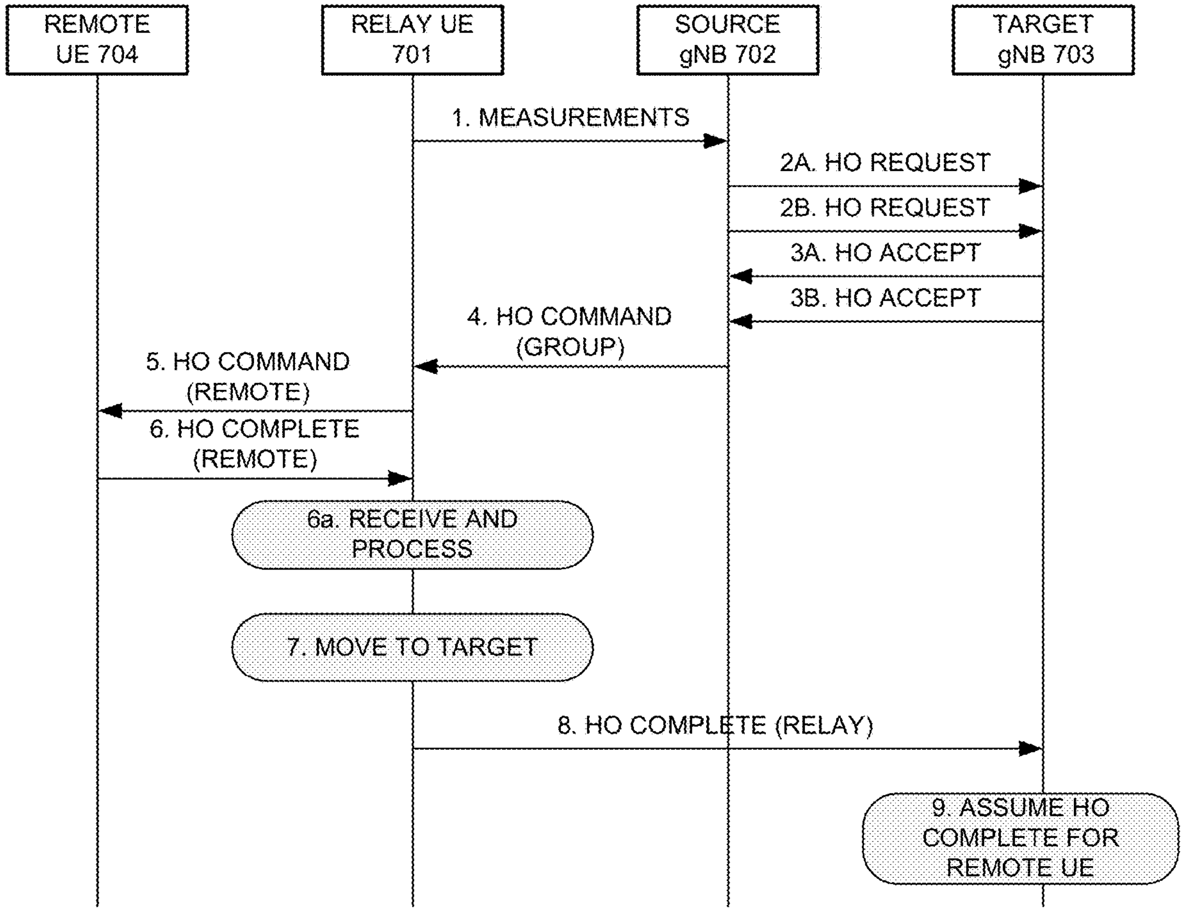
FIG. 7 illustrates a third embodiment of omitted handover complete message in a handover procedure with sidelink relaying in accordance with one novel aspect.

FIG. 7 illustrates a third embodiment of omitted handover complete message in a handover procedure with sidelink relaying in accordance with one novel aspect. A third solution depends on omitting the handover complete messages from the remote UEs entirely. When the target network node receives the relay UE's handover complete message, it interprets it to mean that all remote UEs have also handed over successfully. This of course eliminates any issue with the delivery of the handover complete messages. However, it assumes that the remote UEs will be able to comply with the reconfigurations, and accordingly, the relay UE needs to wait for some response from the remote UEs before completing its own handover. The race condition between remote and relay handovers is avoided since all handover signaling for the remote UE takes place in the source network node, and no remote UE signaling to the target network node is needed.

Error cases can occur in handover, and the effects on the group handover need to be considered. In the case of omitted handover complete message, if any remote UE cannot complete the handover (e.g. because of a lost message or an incompatibility with the requested upper layer configuration), all the involved UEs, including the relay UE, will fail to hand over. Similarly, if any remote UE delays its response message, all the involved UEs, including the relay UE, will need to delay completion of their own handovers until the late response is received, which could cause handover failures (e.g. due to timers expiring on the network side).

A signaling flow for a group handover with omitted handover complete messages is shown in FIG. 7. The procedure begins in a similar manner to other group handover approaches. Relay UE 701 sends one or more measurement reports to source gNB 702 (step 1). Source gNB 702 and target gNB 703 exchange HO request and HO accept (steps 2*a*, 2*b*, 3*a*, 3*b*). In step 4, the group handover command is sent to relay UE 701 from source gNB 702. The relay UE 701 does not stop forwarding messages, but it sends the handover command to the remote UE 704 (step 5). The remote UE 704 responds with a handover complete message (step 6). The relay UE 701, receives and processes the handover complete message (step 6*a*), and terminates the handover complete message in a protocol sense, rather than forwarding it to the target gNB as a terminating node. The remote UE's handover complete message may be a message of a protocol specific to the sidelink between the relay and remote UEs, such as a PC5-RRC protocol. The relay UE 701 moves to the target cell (step 7). Note that this step 7 needs not be sequential with steps 5 and 6. However, depending on the sidelink configuration in the source cell, it may be expedient for relay UE 701 to complete the communication with the remote UE 704 in steps 5 and 6 before switching cells, because the availability of radio resources for sidelink communication may be different in the target cell. Once the relay UE 701 has switched to the target cell, it sends its own handover complete message to target gNB 703 as usual (step 8), and the target gNB 703 infers from this message that the remote UE 704 has completed the handover (step 9).

In all the solutions described above, the handling of user plane data also needs to be considered. In general, the relay UE can keep forwarding user plane packets from the remote UE to the source network node until the moment the relay UE moves to the target network node; since the source network node has sent a handover command for the remote UE, these packets should be forwarded to the target network node as usual, in accordance with handover procedures. However, after moving to the target network node, the relay UE should not forward any user plane packets from the remote UE to the target network node until the remote UE has completed its own handover. This condition may not be clear to the relay UE, since it cannot read the signaling messages from the remote UE. A first option for resolving this issue may be to start forwarding packets as soon as any signaling message from the remote UE is delivered by the relay UE to the target network node; however, this option may cause unexpected results if the signaling message is not the handover complete message (for instance, packets may be delivered to the target network node for a remote UE that has not yet completed its handover, and the target network node may be unable to process them normally). A second option may be for the target network node to send an explicit or implicit indication to the relay UE when the remote UE completes its handover; this indication may be interpreted by the relay UE to mean that forwarding of user plane data in the uplink direction can resume. It is noted that neither option is needed in conjunction with the "omitted handover complete message" approach, since in that approach, the relay UE can know that the remote UEs are considered to have completed handover as soon as the relay UE itself completes handover.

In the first embodiment of "delayed handover complete" and the second embodiment of "delayed group handover command" solutions, the relay UE may group the handover complete messages together. In one such approach, the relay UE may send its own handover complete message together with the handover complete messages for the remote UEs. In another such approach, the relay UE may send its own handover complete message separately, but send a single container message that includes all the handover complete messages for the remote UEs. If the handover complete messages are sent in a group, the relay UE must determine when the group message should be sent. One possible criterion is that the relay UE sends the group message when it has received a signaling message from each remote UE. This criterion runs the risk of including another signaling message instead of the handover complete message, which will then need to be handled in some fashion by the target network node implementation (for example, the unexpected signaling message may be discarded). In such a scenario, the handover complete message would still be expected to be delivered later as part of the normal relaying relationship between the relay UE and the affected remote UE.

It is noted that in all the solutions considered herein, it may be beneficial to deliver the handover commands as a group message, in accordance with the "group handover command" technique discussed above. If the handover commands for the various UEs are sent as separate messages, there is a risk that the relay UE receives its handover command and moves to the target network node before it has received all the handover commands for the remote UEs. In such a case, any handover command that has not been received by the time the relay UE performs handover will never be delivered, resulting in a failure of the handover of the remote UE on the network side and in a desynchronised condition between the network and the remote UE (since from the remote UE's perspective, it is still served by the source network node).

Figure 8:
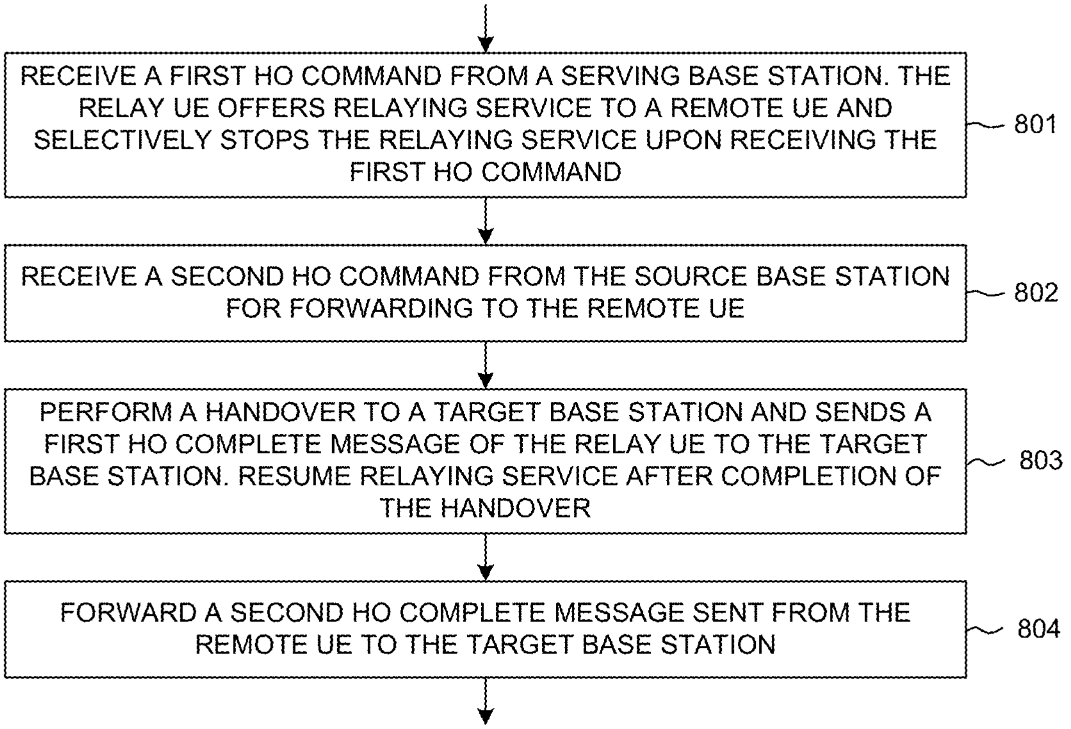
FIG. 8 is a flow chart of a method of delayed handover command or delayed handover complete message in a handover procedure with sidelink relaying in accordance with one novel aspect.

FIG. 8 is a flow chart of a method of delayed handover command or delayed handover complete message in a handover procedure with sidelink relaying in accordance with one novel aspect. In step 801, a relay UE receives a first handover command from a source base station. The relay UE offers relaying service to a remote UE and selectively stops the relaying service upon receiving the first handover command. In step 802, the relay UE receives a second handover command from the source base station for forwarding to the remote UE. In step 803, the relay UE performs a handover to a target base station and sends a first handover complete message of the relay UE to the target base station. The relay UE resumes the relaying service after completion of the handover. In step 804, the relay UE forwards a second handover complete message sent from the remote UE to the target base station.

Figure 9:
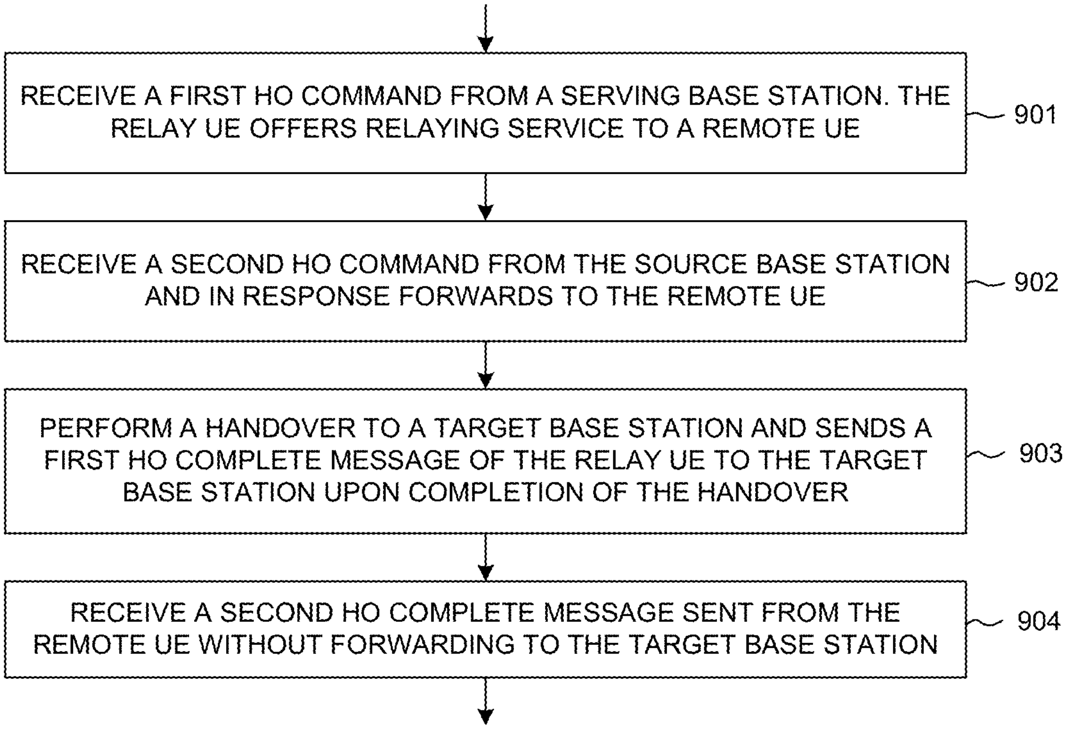
FIG. 9 is a flow chart of a method of omitted handover complete message in a handover procedure with sidelink relaying in accordance with one novel aspect.

FIG. 9 is a flow chart of a method of omitted handover complete message in a handover procedure with sidelink relaying in accordance with one novel aspect. In step 901, a relay UE receives a first handover command from a source base station. The relay UE offers relaying service to a remote UE. In step 902, the relay UE receives a second handover command from the source base station, and in response forwards the second handover command to the remote UE. In step 903, the relay UE performs a handover to a target base station and sends a first handover complete message of the relay UE to the target base station upon completing the handover. In step 904, the relay UE receives a second handover complete message sent from the remote UE without forwarding the second handover complete message to the target base station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

receiving a first handover command from a source base station by a relay user equipment (UE), wherein the relay UE offers relaying service to a remote UE;

receiving a second handover command from the source base station, and in response forwarding the second handover command to the remote UE; performing a handover to a target base station by the relay UE and sending a first handover complete message of the relay UE to the target base station upon completing the handover; and receiving, by the relay UE, a second handover complete message sent from the remote UE, and wherein the relay UE terminates the second handover complete message without forwarding the second handover complete message.

2. The method of claim 1, wherein the first handover command and the second handover command are contained in a container message for group handover.

3. The method of claim 1, wherein the performing the handover by the relay UE occurs after receiving the second handover complete message from the remote UE.

4. A relay User Equipment (UE) comprising:

a receiver that receives a first handover command from a serving base station by the relay user equipment (UE), wherein the relay UE offers relaying service to a remote UE;

a transmitter that forwards a second handover command to the remote UE in response to receiving the second handover command from the serving base station;

a handover handling circuit that performs a handover to a target base station, wherein the relay UE sends a first handover complete message to the target base station upon completing the handover; and a traffic relaying controller that receives a second handover complete message sent from the remote UE and terminates the second handover complete message without forwarding the second handover complete message.

5. The relay UE of claim 4, wherein the first handover command and the second handover command are contained in a container message for group handover.

6. The relay UE of claim 4, wherein the performing the handover by the relay UE occurs after receiving the second handover complete message from the remote UE.

* * * * *